United States Patent
Kamthe

(10) Patent No.: US 10,492,126 B2
(45) Date of Patent: Nov. 26, 2019

(54) BLUETOOTH LOW ENERGY DEVICE STATE TRANSITION

(71) Applicant: Aruba Networks, Inc., Sunnyvale, CA (US)

(72) Inventor: Ankur Kamthe, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/447,890

(22) Filed: Mar. 2, 2017

(65) Prior Publication Data

US 2018/0255504 A1 Sep. 6, 2018

(51) Int. Cl.
| | |
|---|---|
| H04W 48/16 | (2009.01) |
| H04W 8/00 | (2009.01) |
| H04W 72/04 | (2009.01) |
| H04W 4/80 | (2018.01) |
| H04W 84/18 | (2009.01) |

(52) U.S. Cl.
CPC ............ *H04W 48/16* (2013.01); *H04W 4/80* (2018.02); *H04W 8/005* (2013.01); *H04W 72/0446* (2013.01); *H04W 84/18* (2013.01)

(58) Field of Classification Search
CPC ..... H04W 48/16; H04W 4/008; H04W 8/005; H04W 72/0446; H04W 484/18
USPC ................................................ 455/41.1–41.3
See application file for complete search history.

(56) References Cited

U.S. PATENT DOCUMENTS

| | | | |
|---|---|---|---|
| 9,282,582 B1 | 3/2016 | Dunsbergen et al. | |
| 9,462,623 B2 | 10/2016 | Jakusovszky et al. | |
| 9,503,969 B1 | 11/2016 | Zakaria | |
| 2007/0047506 A1 | 3/2007 | Froehling et al. | |
| 2011/0153818 A1 | 6/2011 | Vandwalle et al. | |
| 2013/0040573 A1* | 2/2013 | Hillyard ............... | H04W 8/005 455/41.2 |
| 2013/0090061 A1* | 4/2013 | Linde ................... | H04W 8/005 455/41.2 |

(Continued)

FOREIGN PATENT DOCUMENTS

| | | |
|---|---|---|
| CN | 101627653 | 1/2010 |
| KR | 20080104646 | 12/2008 |
| WO | WO-14080252 | 5/2014 |

OTHER PUBLICATIONS

Shan, G. et al.: "Optimal AdvInterval for BLE scanning in different number of BLE devices environment"; Nov. 30, 2016; 1 page.

*Primary Examiner* — Edward F Urban
*Assistant Examiner* — Angelica M Perez
(74) *Attorney, Agent, or Firm* — Brooks, Cameron & Huebsch, PLLC

(57) ABSTRACT

Example implementations relate to beacon sensor device state transition. In some examples, a beacon sensor device can include a communication resource and a processing resource. In some examples, the beacon sensor device can include a memory resource storing machine readable instructions to cause the processing resource to perform at particular, non-uniform time intervals, a plurality of scans of a same duration of other beacon sensor devices within a same network as the beacon sensor device for a state transition notification. In response to the communication resource detecting the state transition notification, the beacon sensor device can be transitioned to a state corresponding to the state transition notification in some examples.

13 Claims, 4 Drawing Sheets

(56) References Cited

U.S. PATENT DOCUMENTS

| | | | | |
|---|---|---|---|---|
| 2014/0357192 A1* | 12/2014 | Azogui | ................... | H04B 7/26 |
| | | | | 455/41.2 |
| 2015/0133054 A1* | 5/2015 | Chen | ................... | H04W 74/002 |
| | | | | 455/41.2 |
| 2016/0241989 A1* | 8/2016 | Chen | ....................... | H04W 4/04 |
| 2018/0041861 A1* | 2/2018 | Zhang | ................... | H04W 4/008 |
| 2018/0104406 A1* | 4/2018 | Kamen | ............. | A61M 5/14244 |

* cited by examiner

BLUETOOTH LOW ENERGY DEVICE STATE TRANSITION

BACKGROUND

Beacon sensor devices may facilitate connection with network devices by sending advertisement data frames. The advertisement data frames may be sent wirelessly to network devices. An advertisement data frame may correspond to a particular format. The beacon sensor device may continue to send advertisement data frames using the particular format. A Bluetooth low energy (BLE) device is a beacon sensor device that uses BLE technology.

DETAILED DESCRIPTION

Figure 1:
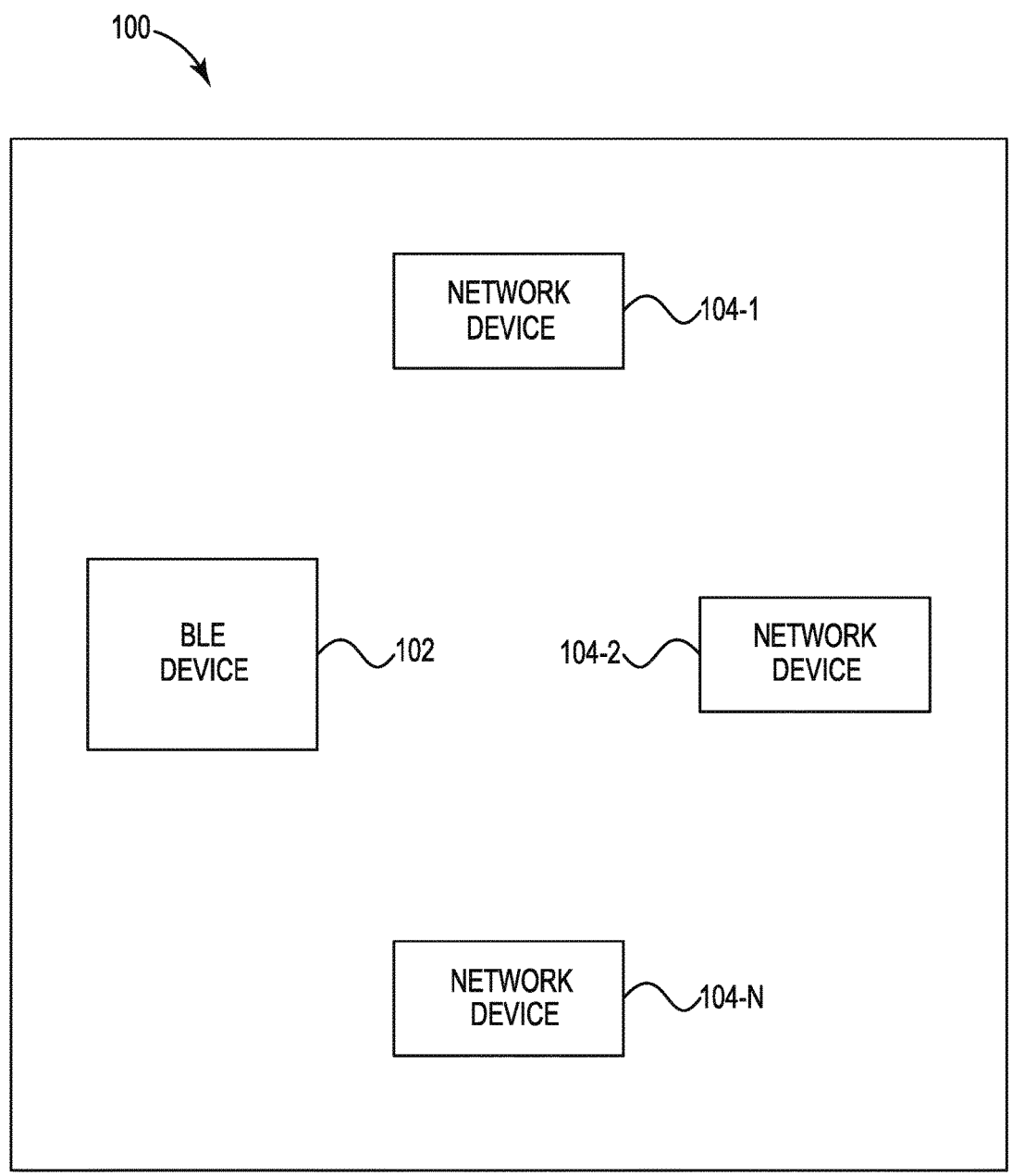
FIG. 1 illustrates a diagram of an example of a wireless network consistent with the disclosure.

A beacon sensor device, such as a BLE device, refers to any type of device capable of transmitting and receiving advertisements and responses. A BLE device can broadcast an identifier to neighboring devices such as a client device or another BLE device. As used herein, a client device can, for example, refer to a device including a processing resource, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

A BLE device can be part of a network of BLE devices. For instance, BLE devices within the network can be interconnected and may share a common active or dormant state. For example, a network as a whole may be in a dormant state or an active state. As used herein, 'interconnect' or used descriptively as 'interconnected' can, for example, refer to a communication pathway established over an information-carrying medium. The 'interconnect' may be a wired interconnect, wherein the medium is a physical medium (e.g., electrical wire, optical fiber, cable, bus traces, etc.), a wireless interconnect (e.g., air in combination with wireless signaling technology) or a combination of these technologies.

In order to maintain desired network lifetimes for battery-operated BLE devices, BLE devices operate in a dormant state. As used herein, a dormant state can, for example, refer to a condition of a BLE device in which it is inactive but prepared to receive a new service request. For instance, a BLE device in a dormant state can have reduced power consumption compared to an active (also known as operational) state. As used herein, an active state can, for example, refer to a condition of a BLE device when it is operating in a defined mode, and a system or service is aware of its operational state. A wakeup phase, as used herein, can, for example, refer to a transitional phase between a dormant state and an active state in which a BLE device advertises a wakeup signal to neighboring devices. A shutdown phase, as used herein, can, for example, refer to a transitional phase between an active state and a dormant state in which a BLE device advertises a shutdown signal to neighboring devices.

In some approaches, during active and/or dormant states, BLE devices within a network can scan at uniform intervals and for a uniform scanning duration to determine if a neighboring BLE device within its network or an external device (BLE or not) is advertising a signal to transition to a different state. As used herein, a scanning interval can, for example, refer to an intervening time between scans. Put another way, a scanning interval is a break in scanning activity. As used herein, a scanning duration can, for example, refer to a length of time that scanning continues. For instance, a BLE device in an active state may scan every five minutes for a duration of 200 milliseconds (ms) to see if a nearby BLE device is advertising a signal to transition to a dormant state. However, in a multi-hop network, such an approach may take a longer-than-desired time for the network to respond to the new state transition stimulus.

For instance, with the example uniform intervals and uniform durations, an expected time to wake up in a first scan interval is two-and-a-half minutes, and in a 100-hop network where one BLE device can see one other BLE device, an average wakeup time for the network may be 250 minutes (four hours). In response to a BLE device not detecting a stimulus in a first attempt, a wakeup time can increase from two-and-a-half minutes to seven-and-a-half minutes for a second attempt and twelve-and-a-half minutes for a third attempt.

In contrast, examples of the present disclosure can decrease BLE device state transition times using non-uniform scanning intervals and uniform or non-uniform scan durations. While examples herein refer to BLE devices, other beacon sensor devices can be used. For instance, examples of the present disclosure can include scanning BLE devices at non-uniform intervals. A scan interval time can be doubled after each scan. For example, intervals can be one minute, two minutes, four minutes, and eight minutes. By doing so, BLE devices can have a response time of thirty seconds in a first scan interval, two minutes in a second scan interval, five minutes in a third scan interval, and eleven minutes in a fourth scan interval. By splitting scan-periods into shorter, non-uniform intervals, a 100-hop network can wake or go dormant faster as opposed to networks scanning at uniform intervals. For instance, a network may transition states in 50 minutes, as opposed to 250 minutes as in other approaches.

By decreasing wakeup and/or shutdown times for BLE devices, examples of the present disclosure can demonstrate network longevity and a responsive network during times of operation. For end customers, examples of the present disclosure may result in a reduction in the frequency of BLE device replacement. For network administrators, examples of the present disclosure may result in few service calls to address battery depletion due to a network being awake during times of non-use.

FIG. 1 illustrates an example environment 100 for a BLE device. As shown in FIG. 1, environment 100 may include multiple components. Environment 100 may include a BLE device 102. BLE device 102 can scan other BLE devices within environment 100 (e.g., within a network) for state transition notifications and/or can advertise their own wakeup or shutdown signal to other BLE devices.

Environment 100 may further include a plurality of network devices 104-1, 104-2 ... 104-N (referred to collectively hereinafter as network devices 104). As used herein, a network device can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. In some examples, network devices 104 can include other BLE devices. As used herein, can, for example, refer to data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells. Network devices 104 may receive transmissions, such as state transition notifications, from BLE device 102. As used herein, a state transition notification can, for example, refer to a notification instructing a BLE or other network device to transition to an active state or a dormant state. Additionally or alternatively, a state transition notification can include a notification that the BLE device doing the notifying is transitioning to an active state or a dormant state. Further discussion regarding the transmissions is presented herein with regards to FIGS. 2, 3, and 4.

Figure 2:
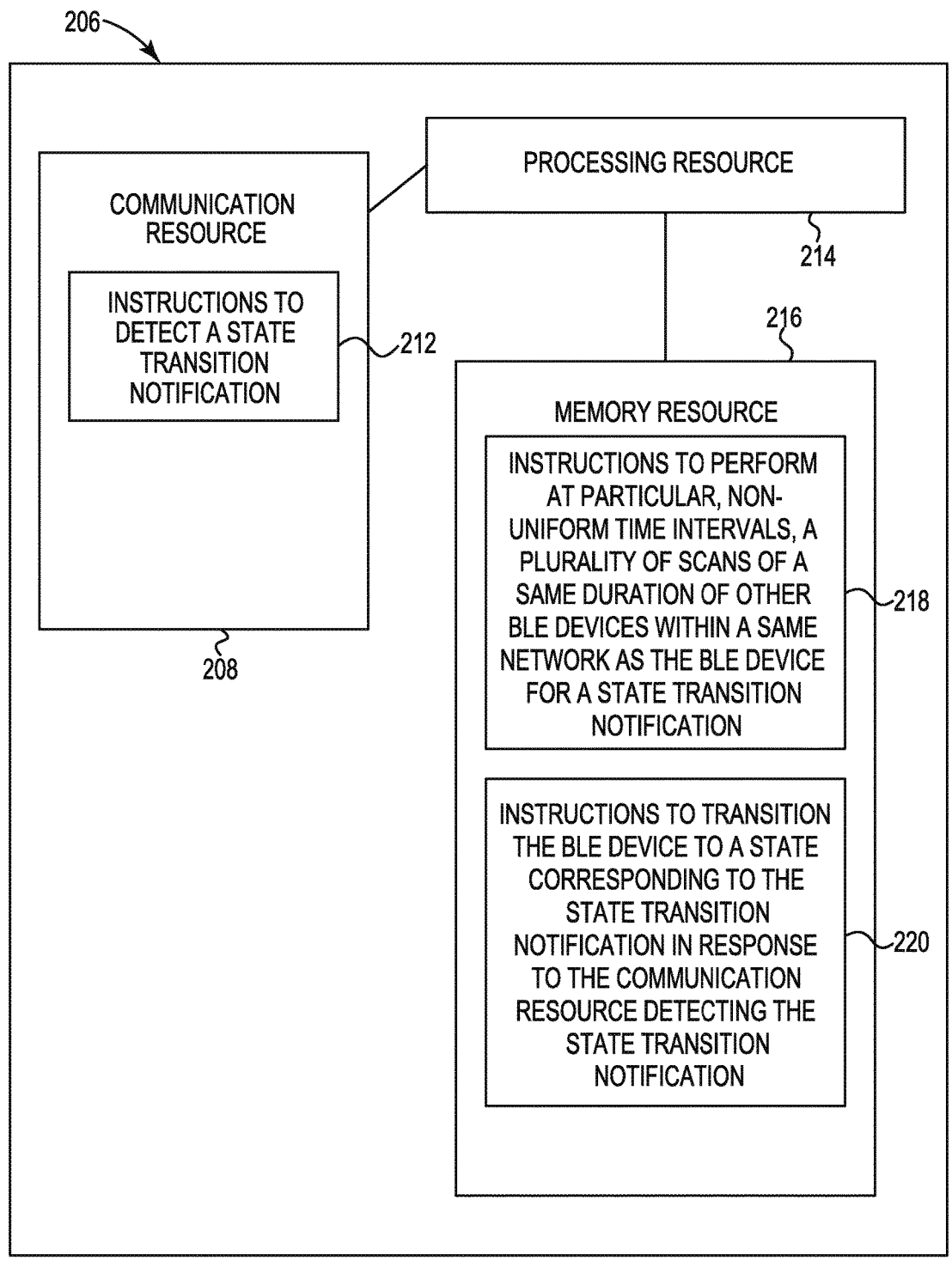
FIG. 2 illustrates a diagram of an example of a BLE device consistent with the disclosure.

FIG. 2 illustrates an example BLE device 206 according to the disclosure. BLE device 206 may be a device capable of transmitting and receiving notifications and responses. As shown in FIG. 2, BLE device 206 may include multiple components. For example, BLE device 206 may include a communication resource 208. As used herein, a communication resource can, for example, refer to hardware to transmit and/or receive communications. Communication resource 208 may be hardware device suitable for retrieval and execution of instructions such as instructions 212.

In some examples, instructions 212, when executed by communication resource 208, may cause communication resource 208 to detect a state transition notification. The detection, as will be discussed further herein, can be in response to a scan by BLE device 206 of other BLE devices for the state transition notification. The state transition notification may be a dormant-to-active state transition notification or an active-to-dormant state transition notification. For instance, if the BLE is currently in a dormant state, the state transition notification is a dormant-to-active state transition notification. If the BLE is currently in an active state, the state transition notification is an active-to-dormant state transition notification.

The state transition notification can be generated by a mobile device and/or another BLE device. For instance, the state transition notification can be generated by a mobile phone (e.g., smartphone), computing device, tablet, notebook computing device, or a laptop computing device, among others. In some examples, a network administrator may initiate the state transition notification via the mobile device. In such an example, the network administrator can initiate the state transition notification to shut down or wake up a network of BLE devices.

BLE device 206 may further include a processing resource 214 and a memory resource 216. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 214 may be a central processing unit (CPU), a semiconductor based microprocessor, and/or other hardware devices suitable for retrieval and execution of instructions stored in memory resource 216. Processing resource 214 may fetch, decode, and execute instructions 218, 220, or a combination thereof. As an alternative or in addition to retrieving and executing instructions, processing resource 214 may include at least one electronic circuit that includes electronic components for performing the functionality of instructions 218, 220, or a combination thereof.

Memory resource 216 may be any electronic, magnetic, optical, or other physical storage device that stores executable instructions. Thus, memory resource 216 may be, for example, Random Access Memory (RAM), an Electrically-Erasable Programmable Read-Only Memory (EEPROM), a storage drive, an optical disc, and the like. Memory resource 216 may be disposed within BLE device 206, as shown in FIG. 2. In this situation, the executable instructions may be "installed" on the BLE device 206. Additionally and/or alternatively, memory resource 216 may be a portable, external or remote storage medium, for example, that allows BLE device 206 to download the instructions from the portable/external/remote storage medium. In this situation, the executable instructions may be part of an "installation package". As described herein, memory resource 216 may be encoded with executable instructions for a BLE device.

BLE device 206 may include instructions 218 to cause a processing resource, such as processing resource 214, to perform, at particular, non-uniform time intervals, a plurality of scans of a same duration of other BLE devices within a same network as BLE device 206 for a state transition notification. The plurality of scans may be performed for dormant-to-active state transition notifications or for active-to-dormant state transition notifications. In some examples, each of the plurality of scans can be performed for a same duration of 150 ms, and the particular non-uniform time intervals can be one minute, two minutes, four minutes, and eight minutes. The duration, in some examples, can be different than 150 ms, and the non-uniform time intervals can be different. A cumulative duration for the plurality of scans can be 600 ms, and a sum of the time intervals can be fifteen minutes.

In some examples, BLE device 206 may include instructions 220 to cause processing resource 214 to transition, in response to the communication resource detecting the state transition notification, the BLE device to a state corresponding to the state transition notification. For instance, the BLE device can be transitioned to a dormant state or an active state. As described previously, instructions 212 may cause communication resource 208 to detect a state transition notification. Communication resource 208 may transmit the state transition notification to processing resource 214.

Figure 3:
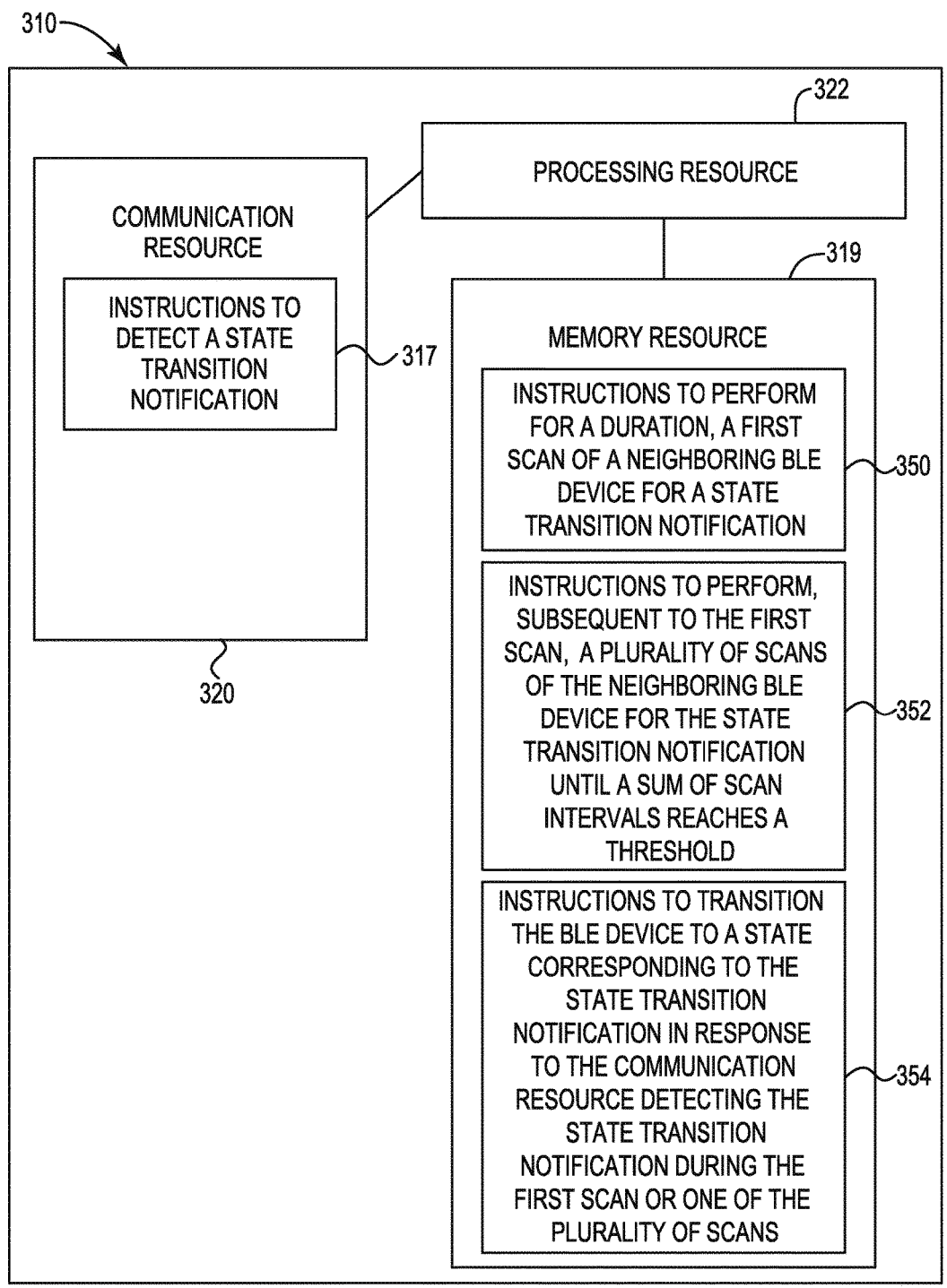
FIG. 3 illustrates a diagram of an example of a beacon sensor device consistent with the disclosure.

FIG. 3 illustrates a diagram of an example of a beacon sensor device 310 consistent with the disclosure. In such an example, beacon sensor device can be a BLE device, but examples are not so limited. Similar to BLE device 206 illustrated in FIG. 2, beacon sensor device 310 may be a device capable of transmitting and receiving advertisements and responses. Beacon sensor device 310 may include multiple components. For example, beacon sensor device 310 may include a communication resource 320. Communication resource 320 may be a hardware device suitable for retrieval and execution of instructions such as instructions 317.

In some examples, instructions 317, when executed by communication resource 320, may cause communication resource 320 to detect a state transition notification. As will be discussed further herein, the communication resource can receive the state transition notification from a mobile device and/or in response to a scan of other BLE devices within a network.

Beacon sensor device 310 may further include a processing resource 322 and a memory resource 319. Similar to BLE device 206, although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 322 may be a central processing unit (CPU), a semiconductor based microprocessor, and/or other hardware devices suitable for retrieval and execution of instructions stored in memory resource 319. Processing resource 322 may fetch, decode, and execute instructions 350, 352, and 354 or a combination thereof. As an alternative or in addition to retrieving and executing instructions, processing resource 322 may include at least one electronic circuit that includes electronic components for performing the functionality of instructions 350, 352, and 354.

Memory resource 319 may be any electronic, magnetic, optical, or other physical storage device that stores executable instructions. Thus, memory resource 319 may be, for example, RAM, an EEPROM, a storage drive, an optical disc, and the like. Memory resource 319 may be disposed within beacon sensor device 310, as shown in FIG. 3. In this situation, the executable instructions may be "installed" on the beacon sensor device 310. Additionally and/or alternatively, memory resource 319 may be a portable, external or remote storage medium, for example, that allows beacon sensor device 310 to download the instructions from the portable/external/remote storage medium. In this situation, the executable instructions may be part of an "installation package". As described herein, memory resource 319 may be encoded with executable instructions for a BLE device.

Beacon sensor device 310 may include instructions 350 to cause a processing resource, such as processing resource 322, to perform for a duration, a first scan of a neighboring beacon sensor device for the state transition notification. As used herein, a neighboring beacon sensor device can, for example, refer to a device detectable by the beacon sensor device (e.g., beacon sensor device 310) performing a scan. Beacon sensor device 310 can scan a neighboring device for the state transition notification, and may or may not detect the state transition notification. For instance, the neighboring beacon sensor device may not be transmitting a state transition notification, and thus beacon sensor device 310 cannot detect a state transition notification in the duration.

In response to not detecting the state transition notification, beacon sensor device 310 may include instructions 352 to cause a processing resource, such as processing resource 322, to perform, subsequent to the first scan, a plurality of scans of the neighboring beacon sensor device for the state transition notification until a sum of the scan intervals reaches a threshold. Each of the plurality of scans can be performed for the duration at non-uniform time intervals. For instance, after a first time interval has passed subsequent to the first scan, a second scan can be performed for the duration. In response to not detecting the state transition notification, a third scan can be performed after a second time interval. This can continue until the state transition notification is detected or a threshold scan interval sum is reached. For instance, the threshold scan interval sum can be fifteen minutes. This can include a one minute, a two minute, a four minute, and an eight minute scan interval, for instance. In some instances the processing resource can perform, subsequent to the first scan, a plurality of scans of the neighboring beacon sensor device for the state transition notification until a cumulative scan duration reaches a threshold. For instance, the cumulative scan duration can be 600 ms. In some instances, the first and subsequent plurality of scans can be performed iteratively until a state transition notification is detected.

Beacon sensor device 310 may include instructions 354 to cause a processing resource, such as processing resource 322, to transition the BLE device to a state corresponding to the state transition notification in response to the communication resource detecting the state transition notification. For instance, beacon sensor device 310 can be transitioned to an active state or a dormant state.

As described previously, instructions 317 may cause communication resource 320 to detect a state transition notification. Communication resource 320 may then transmit the state transition notification to processing resource 322.

Figure 4:
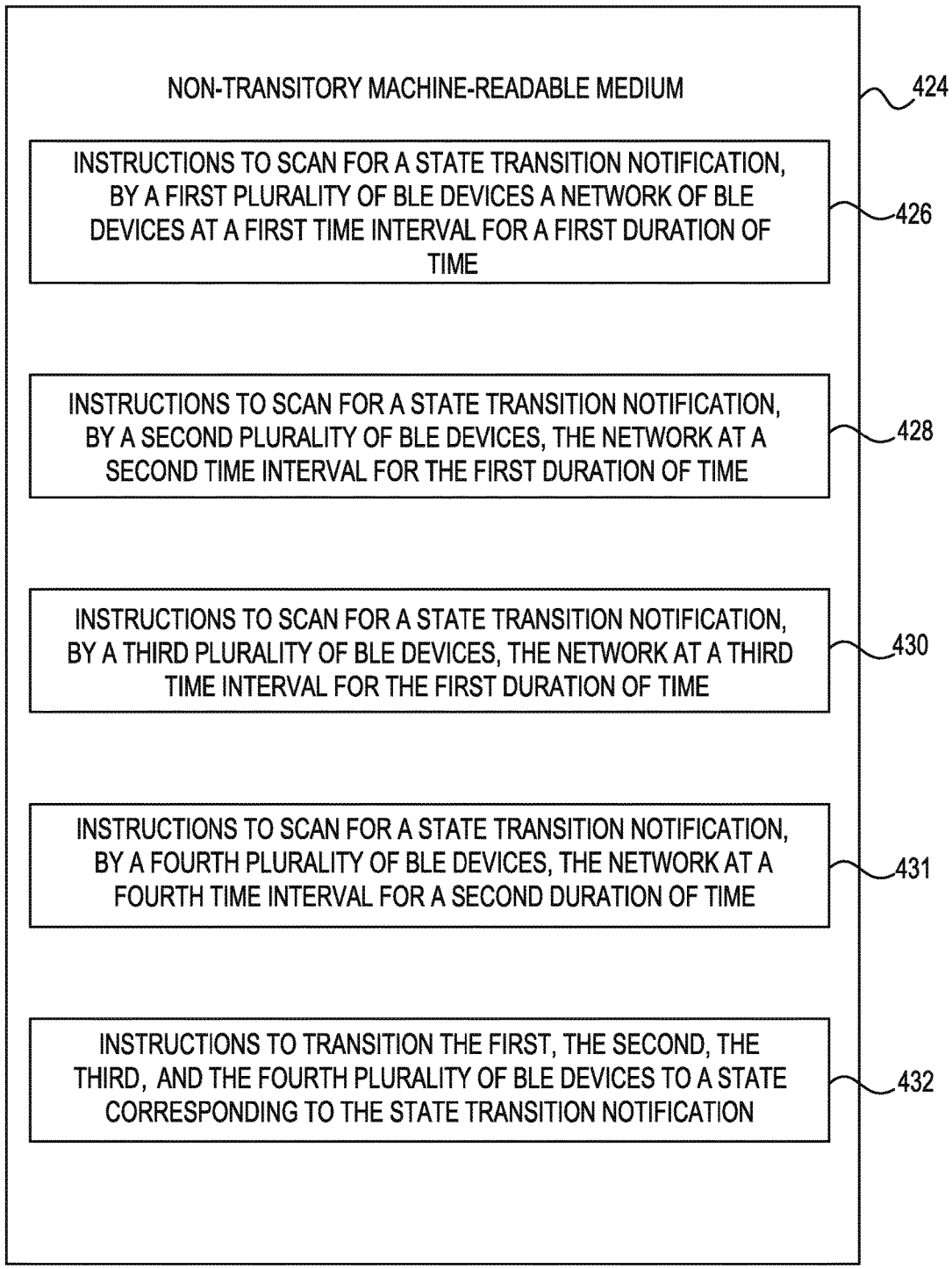
FIG. 4 illustrates a diagram of an example of a non-transitory machine-readable medium and processor for BLE device state transition consistent with the disclosure.

FIG. 4 illustrates an example of medium 424 for a BLE device according to the disclosure. As described herein, the components illustrated in FIG. 4 may perform a number of functions related to a BLE device. Although the following descriptions refer to a single processing resource and a single machine-readable storage medium 424, the descriptions may also apply to a system including multiple processing resources and multiple machine-readable storage mediums. In such examples, the medium 424 may be distributed across multiple machine readable storage mediums and multiple processing resources. Put another way, the instructions executed in the medium 424 may be stored across multiple machine-readable storage mediums and executed across multiple processing resources, such as in a distributed or virtual computing environment.

As illustrated in FIG. 4, the medium 424 may comprise a non-transitory machine-readable storage medium 424 storing machine readable instructions to cause a processing resource (not illustrated in FIG. 4) to perform a number of operations relating to a BLE device. The processing resource may be a central processing unit (CPU), microprocessor, and/or other hardware device suitable for retrieval and execution of instructions stored in machine-readable storage medium 424.

The medium 424 may include instructions 426 to cause the processing resource to scan for a state transition notification, by a first plurality of BLE devices, a network of BLE devices at a first time interval for a first duration of time. The first duration of time, in some examples, can be 133 ms; however, other time durations can be used.

For instance, in an active state, a BLE device within the network can broadcast a dormant state transition notification. The first plurality of BLE devices may scan the network for 150 ms while listening for a wireless transmission including a BLE device shutdown signal that includes instructions that trigger the BLE device to transition to a dormant state. Put another way, each of the first plurality of BLE devices can scan for a shutdown signal. Similar, in a dormant state, a BLE device within the network can broadcast an active state transition notification. The first plurality of BLE devices may scan the network for 150 ms while listening for a wireless transmission including a BLE device wakeup signal that includes instructions that trigger the BLE device to transition to an active state. Put another way, each of the first plurality of BLE devices can scan for a wakeup signal.

The first scanning time interval for the plurality of BLE devices can be one minute. If BLE devices within the first plurality of BLE devices do not detect a state transition notification during the scan, they will stop scanning for a second time interval. This subset of BLE devices may be referred to as a second plurality of BLE device.

For instance, the medium 424 may include instructions 428 to cause the processing resource to scan for the state transition notification, by the second plurality of BLE devices, the network at the second time interval for the first duration of time. In some examples, the second time interval can be twice the length of the first time interval. For instance, the second time interval can be two minutes. If BLE devices within the second plurality of BLE devices do not detect a state transition notification during the scan, they will stop scanning for a third time interval. This subset of BLE devices may be referred to as a third plurality of BLE device.

For example, the medium 424 may further include instructions 430 to cause the processing resource to scan for the state transition notification, by the third plurality of BLE devices, the network at the third time interval for the first duration of time. In some examples, the third time interval can be twice the length of the second time interval. For instance, the third time interval can be four minutes. If BLE devices within the third plurality of BLE devices do not detect a state transition notification during the scan, they will stop scanning for a fourth time interval. This subset of BLE devices may be referred to as a fourth plurality of BLE device.

For example, the medium 424 may further include instructions 431 to cause the processing resource to scan for the state transition notification, by the fourth plurality of BLE devices, the network at the fourth time interval for a second duration of time. The second time interval can be 200 ms. Non-uniform scan durations can result in an increased probability of detecting a state transition notification by scanning more in the longest scan interval (e.g., the fourth time interval). For example, the fourth time interval can be twice the length of the third time interval. For instance, the fourth time interval can be eight minutes. If BLE devices remain that have not detected a state transition notification, the process can be repeated by returning to the first interval scan. In some instances, the first and the second duration of time can be the same duration of time.

Because the plurality of BLE devices can include subsets, the first plurality of BLE devices can include a BLE device within the second plurality of BLE devices, a BLE device within the third plurality of BLE devices, and a BLE device within the fourth plurality of BLE devices. The second plurality of BLE devices can include a BLE device within the third plurality of BLE devices, and a BLE device within the fourth plurality of BLE devices, and the third plurality of BLE devices can include a BLE device within the fourth plurality of BLE devices.

The medium 424 may further include instructions 432 to cause the processing resource to transition the first, the second, the third, and the fourth plurality of BLE devices to a state corresponding to the state transition notification. For instance, the state corresponding to the state transition notification can be a dormant state or an active state. For example, when a shutdown or wakeup signal is received, a BLE device can transition to a shutdown or a wakeup state. A BLE device can remain in the wakeup or shutdown state for a particular period of time, and can transmit dormant or active state transition notifications. For instance, before transitioning to a dormant or an active state, a BLE device in the shutdown or wakeup state can alert neighboring beacons of the instructions received to transition to dormant or active states.

Subsequent to the shutdown or wakeup state, a BLE device can transition to a dormant state or an active state. While in dormant state, a BLE device can reduce its power consumption as compared to operation in the active state.

In the foregoing detailed description of the present disclosure, reference is made to the accompanying drawings that form a part hereof, and in which is shown by way of illustration how various examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, designators such as "N", etc., particularly with respect to reference numerals in the drawings, can, for example, indicate that a number of the particular feature so designated can be included. As used herein, "a number of" a particular thing can, for example, refer to one or more of such things. A "plurality of" is intended to refer to more than one of such things. Multiple like elements may be referenced herein generally by their reference numeral without a specific identifier at the end.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A Bluetooth low energy (BLE) device comprising:
   a communication resource;
   a processing resource;
   a memory resource storing machine readable instructions to cause the processing resource to:
   perform at particular, non-uniform time intervals, a plurality of scans of a same duration of other BLE devices within a same network as the BLE device for a state transition notification, wherein the particular non-uniform time intervals comprise at least two or more of one minute, two minutes, four minutes, and eight minutes, wherein the first duration of time is 133 milliseconds and the second duration of time is 200 milliseconds; and
   in response to the communication resource detecting the state transition notification, transition the BLE device to a state corresponding to the state transition notification.

2. The BLE device of claim 1, further comprising the memory resource to cause the processing resource to perform the plurality of scans for a dormant-to-active state transition notification.

3. The BLE device of claim 1, further comprising the memory resource to cause the processing resource to perform the plurality of scans for an active-to-dormant state transition notification.

4. The BLE device of claim 1, wherein the same duration is 150 milliseconds.

5. A Bluetooth low energy (BLE) device comprising:
a communication resource;
a processing resource; and
a memory resource storing machine readable instructions to cause the processing resource to iteratively:
  perform for a duration, a first scan of a neighboring BLE device for a state transition notification;
  perform, subsequent to the first scan, a plurality of scans of the neighboring BLE device for the state transition notification until a sum of scan intervals reaches a threshold, wherein each of the plurality of scans is performed for a particular duration at non-uniform time intervals that comprise at least two or more of one minute, two minutes, four minutes, and eight minutes, wherein a first duration of time is 133 milliseconds and a second duration of time is 200 milliseconds; and
  in response to the communication resource detecting the state transition notification during the first scan or one of the plurality of scans, transition the BLE device to a state corresponding to the state transition notification.

6. The BLE device of claim 5, wherein the threshold scan interval sum is fifteen minutes.

7. The BLE device of claim 5, further comprising the memory resource to cause the processing resource to perform, subsequent to the first scan, a plurality of scans of the neighboring BLE device for the state transition notification until a cumulative scan duration reaches a threshold.

8. A non-transitory machine readable storage medium having stored thereon machine readable instructions to cause a computer processor to:
  scan for a particular state transition notification, by a first plurality of Bluetooth low energy (BLE) devices, a network of BLE devices at a first time interval for a first duration of time;
  scan for the particular state transition notification, by a second plurality of BLE devices, the network at a second time interval for the first duration of time;
  scan for the particular state transition notification, by a third plurality of BLE devices, the network at a third time interval for the first duration of time;
  scan for the particular state transition notification, by a fourth plurality of BLE devices, the network at a fourth time interval for a second duration of time; and
  transition the first, the second, the third, and the fourth plurality of BLE devices to a state corresponding to the particular state transition notification,
  wherein the first, the second, the third, and the fourth time intervals comprise at least two or more of one minute, two minutes, four minutes, and eight minutes, wherein the first duration of time is 133 milliseconds and the second duration of time is 200 milliseconds, and wherein the particular state transition notification causes the first, the second, the third, and the fourth plurality of BLE devices to transition to the same state.

9. The medium of claim 8, wherein the second time interval is twice the length of the first time interval.

10. The medium of claim 8, wherein the third time interval is twice the length of the second time interval.

11. The medium of claim 8, wherein the fourth time interval is twice the length of the third time interval.

12. The medium of claim 8, wherein the state corresponding to the state transition notification is a dormant state or an active state.

13. The medium of claim 8, wherein:
  the first plurality of BLE devices comprises a BLE device within the second plurality of BLE devices, a BLE device within the third plurality of BLE devices, and a BLE device within the fourth plurality of BLE devices;
  the second plurality of BLE devices comprises a BLE device within the third plurality of BLE devices, and a BLE device within the fourth plurality of BLE devices; and
  the third plurality of BLE devices comprises a BLE device within the fourth plurality of BLE devices.

* * * * *